US010765603B2

(12) United States Patent
Matsumoto et al.

(10) Patent No.: US 10,765,603 B2
(45) Date of Patent: Sep. 8, 2020

(54) MEDICAL CONTAINER

(71) Applicant: Naturan International Co., Ltd., Ayauta-Gun (JP)

(72) Inventors: Shigeki Matsumoto, Ayauta-Gun (JP); Katuhiro Arai, Takamastu (JP); Tsuyoshi Shiga, Ayauta-Gun (JP)

(73) Assignee: Naturan International Co., Ltd., Ayauta-Gun, Kagawa (JP)

( * ) Notice: Subject to any disclaimer, the term of this patent is extended or adjusted under 35 U.S.C. 154(b) by 506 days.

(21) Appl. No.: 15/021,663

(22) PCT Filed: Mar. 6, 2015

(86) PCT No.: PCT/JP2015/056642
§ 371 (c)(1),
(2) Date: Mar. 11, 2016

(87) PCT Pub. No.: WO2015/137247
PCT Pub. Date: Sep. 17, 2015

(65) Prior Publication Data
US 2016/0220445 A1 Aug. 4, 2016

(30) Foreign Application Priority Data

Mar. 13, 2014 (JP) .................................. 2014-049783

(51) Int. Cl.
*A61J 1/14* (2006.01)
*A61J 1/10* (2006.01)
*B65D 85/00* (2006.01)
*C01B 3/10* (2006.01)
*C01B 3/06* (2006.01)

(52) U.S. Cl.
CPC ............... *A61J 1/1468* (2015.05); *A61J 1/10* (2013.01); *A61J 1/1412* (2013.01); *B65D 85/00* (2013.01);
(Continued)

(58) Field of Classification Search
CPC ................ A61K 33/06; A61J 1/14; A61J 1/10
See application file for complete search history.

(56) References Cited

U.S. PATENT DOCUMENTS

2007/0184204 A1* 8/2007 Balagopal ................. C23C 2/02
427/419.2
2008/0268307 A1* 10/2008 Gil ........................... C25B 1/04
429/411

(Continued)

FOREIGN PATENT DOCUMENTS

JP 2003-10865 1/2003
JP 2003-24956 1/2003
(Continued)

OTHER PUBLICATIONS

Kneaded Definition, Oxford Dictionaries, 1994, <https://en.oxforddictionaries.com/definition/knead> see attached NPL.*
(Continued)

Primary Examiner — Tatyana Zalukaeva
Assistant Examiner — Sara A Sass
(74) Attorney, Agent, or Firm — Morrison & Foerster LLP

(57) ABSTRACT

A hydrogen-generating substance that reacts with moisture (liquid water or water vapor) in a medical substance or moisture in air introduced into a medical container is kneaded into an exterior sheet 40 of the medical container that encloses the medical substance therein. The medical container can be a bag-shaped medical container, a tube-shaped medical container, a medical container with a sealing fastener or the like. The medical substance containing moisture can be blood, an injection solution, a drug solution, a nutrient solution, a replenishment solution (an infusion solution), an instillation solution or the like. A solid preparation is preferably enclosed within the medical container with the sealing fastener. For example, the hydrogen-gen- (Continued)

erating substance to be kneaded can be metal magnesium and is preferably fine-powdered ceramics obtained by firing the mixture of a hydrogen-generating substance and a mineral substance such as calcium.

10 Claims, 4 Drawing Sheets

(52) U.S. Cl.
CPC ............... C01B 3/061 (2013.01); C01B 3/10 (2013.01); *B32B 2439/80* (2013.01); *Y02E 60/36* (2013.01)

(56) References Cited

U.S. PATENT DOCUMENTS

| | | | |
|---|---|---|---|
| 2010/0206753 A1* | 8/2010 | Oda | A61K 9/0019 206/221 |
| 2013/0112600 A1* | 5/2013 | Satoh | A23L 2/54 210/136 |
| 2016/0185517 A1* | 6/2016 | Matsumoto | B65D 75/5883 426/66 |

FOREIGN PATENT DOCUMENTS

| | | |
|---|---|---|
| JP | 2004-330028 | 11/2004 |
| JP | 2004330028 A * | 11/2004 |
| JP | 2010-222196 | 10/2010 |
| JP | 2011-177242 | 9/2011 |
| JP | 2013-138920 | 7/2013 |
| JP | 2014-19635 | 2/2014 |
| JP | 2014-104455 | 6/2014 |
| WO | 2010/116192 A1 | 10/2010 |

OTHER PUBLICATIONS

International Search Report and Written Opinion dated Jun. 16, 2015, directed to International Application No. PCT/JP2015/056642; 6 pages.

* cited by examiner

MEDICAL CONTAINER

CROSS-REFERENCE TO RELATED APPLICATIONS

This application is a national phase filing under 35 U.S.C. § 371 of International Application No. PCT/JP2015/056642, filed Mar. 6, 2015, and which claims priority to Japanese Patent Application No. 2014-049783, filed on Mar. 13, 2014, the contents of which prior applications are incorporated herein by reference.

FIELD OF THE INVENTION

The present invention relates to a medical container used for enclosing blood or the like.

BACKGROUND OF THE INVENTION

Various medical substances such as blood, injection solution and various types of instillation solutions are enclosed within airtight containers and then are supplied to medical personnel such as doctors (see Patent Literature 1 which discloses a blood bag).

For example, a liquid medical substance such as blood is generally enclosed within a bag-shaped medical container. An external medicine, typically an ointment, is generally enclosed within a tube-shaped medical container. In many cases, a solid preparation is enclosed within a medical container that is openable and sealable with a sealing fastener.

A medical substance is enclosed within a medical container so that the medical substance is shielded the medical substance from outside air to maintain a sterilized state or a state in which bacteria are destroyed and is prevented from deteriorating due to a reaction with oxygen in the air. A medical substance normally has its expiration date and will be generally discarded if the expiration date is passed.

Recently, hydrogen-reduced water containing reduced hydrogen (H⁻) has attracted attention in various fields. For example, utilization of hydrogen-reduced water has been considered for anti-oxidation, cleansing, makeup, preventing and treating skin diseases and the like. Drinking hydrogen-reduced water is also expected to reduce active oxygen in a human body.

As disclosed by Patent Literatures 2 to 4, hydrogen-reduced water containing reduced hydrogen (H⁻) can be easily generated by causing a hydrogen-reactive substance such as metal magnesium to react with water without using an electrolysis apparatus or the like. That is, for example, reduced hydrogen is generated in a process in which water and metal magnesium react with each other to become magnesium hydroxide and hydrogen gas. To make hydrogen-reduced water easily available, Patent Literature 3 discloses that a water-permeable bar-like cartridge filled with magnesium powder is placed inside a container such as a pet bottle that is filled with water.

PATENT LITERATURE

Patent Literature 1: Japanese Laid-Open Patent application No. 2013-138920
Patent Literature 2: Japanese Laid-Open Patent application No. 2004-330028
Patent Literature 3: Japanese Laid-Open Patent application No. 2003-10865
Patent Literature 4: Japanese Laid-Open Patent application No. 2003-24956

SUMMARY OF THE INVENTION

Even if medical substances are enclosed within medical containers in the manner as described above, a little amount of air enters the medical containers during the enclosing process. Accordingly, the deterioration (the oxidation) caused by oxygen in the air cannot be avoided. In particular, additional outside air tends to enter a medical container openable with a sealing fastener each time the medical container is opened and closed, and this accelerates the deterioration.

Medical substances are especially needed to be stored as stocks in a large amount for emergencies and disasters. In addition, the long-term preservation of medical substances is demanded. The deterioration of medical substances caused by oxygen in the air, however, makes the long-term preservation difficult.

The present invention has been made in view of the foregoing, and it is an object of the present invention to provide a medical container that is capable of preventing or reducing deterioration caused by oxygen in the air having entered the medical container.

To achieve the foregoing object, the present invention applies basically the following solution. Specifically, a hydrogen-generating substance for generating hydrogen gas by reacting with moisture (liquid water or water vapor) from the enclosed medical substance is kneaded into an exterior sheet constituting the medical container. Accordingly, after the medical substance is enclosed within the medical container, moisture in the medical substance reacts with the hydrogen-generating substance kneaded in the exterior sheet to generate hydrogen. Consequently, even if air enters the medical container during the medical substance is enclosed into the medical container, oxygen in the medical container is converted to water which is harmless because the oxygen in the introduced air has high reactivity with the generated hydrogen. Thus, the deterioration of the medical substance due to oxidation is prevented or reduced. Even if a solid preparation is enclosed, moisture in the air introduced into the medical container reacts with the hydrogen-generating substance kneaded in the exterior sheet to generate hydrogen, thereby converting the oxygen in the medical container to water which is harmless.

More specifically, the present invention applies a first solution below. That is, in a medical container for enclosing a medical substance containing at least moisture therein, a hydrogen-generating substance for generating hydrogen gas by reacting with liquid water or water vapor from the enclosed medical substance is kneaded into an exterior sheet constituting the medical container. According to the above solution, after the medical substance is enclosed within the medical container, the hydrogen-generating substance reacts with liquid water or water vapor in the medical substance to generate hydrogen and the generated hydrogen reacts with oxygen in the air in the medical container, thereby the oxidation of the medical substance is prevented or reduced. Consequently, the preservation period (the usable period) of the medical substance can be lengthened.

Preferable aspects based on the above first solution are set forth. That is, said exterior sheet includes a water-vapor permeable sheet which does not permit passage of liquid water and permits passage of water vapor and an outer sheet positioned outside said water-vapor permeable sheet, and said hydrogen-generating substance is kneaded into said outer sheet. With this feature, water in the medical substance that is in the form of water vapor contacts the hydrogen-generating substance to generate hydrogen, and the generated hydrogen is introduced to the medical substance through the water-vapor permeable sheet. Since the water-vapor permeable sheet that does not permit passage of water is positioned between the enclosed medical substance and the hydrogen-generating substance, the hydrogen-generating substance or a reactant excluding the hydrogen that is generated during the generation of the hydrogen can be prevented from contacting the medical substance.

The medical container has a bag shape or a tube shape

The medical container is a bag-shaped medical container for enclosing blood therein. With this feature, the preservation period of blood in the medical container can be lengthened.

The medical container is a bag-shaped medical container for enclosing any one of an injection solution, a drug solution, a nutrient solution, a replenishment solution (an infusion solution), and an instillation solution therein. With this feature, the preservation period of each of the above solutions can be lengthened.

The medical container has an openable lid and is a tube-shaped medical container for enclosing an external medicine therein. With this feature, the preservation period of the external medicine can be lengthened.

To achieve the above object, the present invention applies a second solution as follows. That is, in a medical container which can be opened and closed by means of a sealing fastener and can enclose a solid preparation therein, a hydrogen-generating substance for generating hydrogen gas by reacting with moisture in air introduced into the medical container when the sealing fastener is opened is kneaded into an exterior sheet constituting the medical container. According to the above solution, the hydrogen-generating substance reacts with the moisture in the air enclosed within the medical container to generate hydrogen and the generated hydrogen reacts with oxygen in the air in the medical container, thereby preventing or reducing oxidation of the medical substance. When the medical container is sealed again after taking out part of the solid preparation by opening the sealing fastener, new air enters the medical container. In this case, however, the hydrogen-generating substance reacts with moisture in the new air to generate hydrogen, thereby preventing or reducing the oxidation of the medical substance. Thus, the preservation period of the medical substance can be lengthened. For this reason, the medical container is remarkably preferable as a medical container that is openable repeatedly.

Preferable aspects based on the above second solution are set forth. That is, said exterior sheet includes a water-vapor permeable sheet which does not permit passage of water and permits passage of water vapor and an outer sheet positioned outside said water-vapor permeable sheet, and the hydrogen-generating substance is kneaded into said outer sheet Said exterior sheet is configured by attaching a hydrogen-generating sheet to an inner surface of the outer sheet having a sealing function, and a hydrogen-generating substance for generating hydrogen gas by reacting with water is knead into said hydrogen-generating sheet. With this feature, the exterior sheet constituting the existing medical container can be utilized effectively while oxidation of the medical substance using hydrogen can be prevented or reduced. Consequently, the medical container is preferable in view of easiness to produce.

The hydrogen-generating sheet is attached to only part of the outer sheet. With this feature, to reduce the use amount of sheets having the hydrogen-generating substances kneaded therein, a control unit in a facility can cause a sheet having a hydrogen-generating substance kneaded therein to be located at a position that does not inhibit the function of the existing medical container. Thus, the medical container is preferable.

The hydrogen-generating substance is knead in the form of fine-powdered ceramics obtained by firing a mixture of the hydrogen-generating substance and a mineral substance. With this feature, in the medical container, water reacts with the hydrogen-generating substance to generate hydrogen gas as well as reduced hydrogen. The generated reduced hydrogen is immediately absorbed by the mineral ion and continues to exist. Accordingly, the anti-oxidative function of the reduced hydrogen can be obtained. The fine-powdered form of the ceramic is preferable for facilitating the kneading to the exterior sheet.

The hydrogen-generating substance is metal magnesium, and the mineral substance is calcium. With this feature, as the hydrogen-generating substance and the mineral substance, specific preferable substances are provided.

According to the present invention, the oxidation of a medical substance in the medical container can be prevented or reduced so that the preservation period (the usable period) of the medical substance is lengthened.

DETAILED DESCRIPTION OF THE INVENTION

Figure 1:
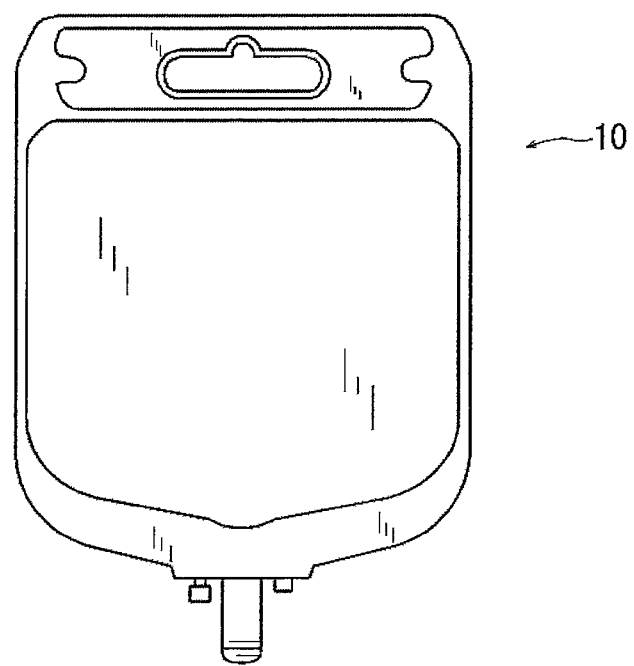
FIG. 1 is a plan view of an example of a bag-shaped medical container to which the present invention is applied.

In FIG. 1, reference numeral 10 denotes an example of a bag-shaped medical container. In this embodiment, the medical container 10 is for storing blood (a blood bag for enclosing blood of a human body). For example, the medical container 10 includes at least front and rear exterior sheets. The opposite circumferential edges of the exterior sheets are integrated with each other so that the medical container 10 is configured in the form of a sealed container shielded from the outside (the outside air). Each exterior sheet is formed of a sheet having flexibility such as a plastic, as will be described later. Examples of a medical substance to be enclosed within such a bag-shaped medical container, the shape of which may vary, include an injection solution, a drug solution, a nutrient solution, a replenishment solution (an infusion solution) and various solutions for instillation (a drug solution, a nutrient solution, a replenishment solution, a physiological saline carrier, or a mixture obtained by mixing them appropriately).

Figure 2:
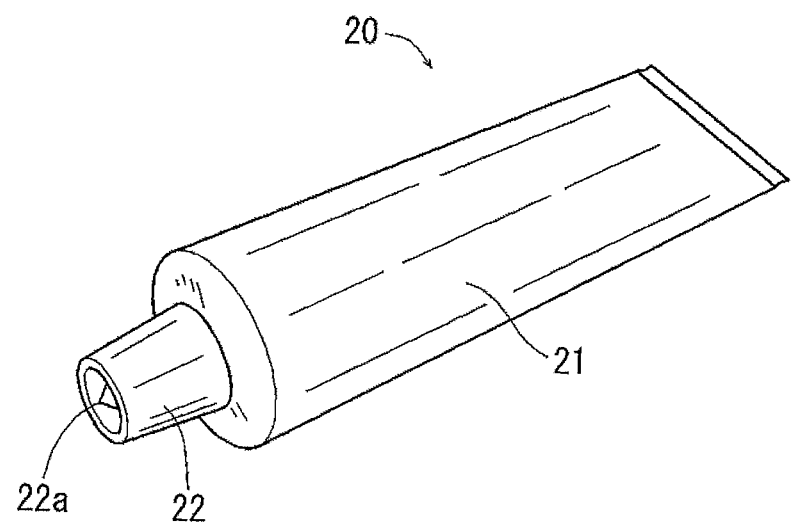
FIG. 2 is a perspective view of an example of a tube-shaped medical container to which the present invention is applied.

In FIG. 2, reference numeral 20 denotes an example of a tube-shaped medical container. The medical container 20 is particularly suitable for a creamy (jellylike) medical substance. The medical container 20 includes a sealed main body 21 and a lid 22 that is engaged with a screw part formed at a mouth (take-out mouth) of the main body 21. For example, the lid 22 is rotated leftward and pulled away from the mouth to expose the mouth of the main body 21 to the outside. In this state, the mouth is closed, and the sealed structure of the main body 21 is kept. The mouth is pressed by a projection 22a formed at the lid 22 thereby opening the mouth. When the main body 21 is pressed in this state, a medical substance enclosed within the main body 21 is extruded (taken out) from the mouth. The main body 21 is configured by using an exterior sheet, as will be described later.

Figure 3:
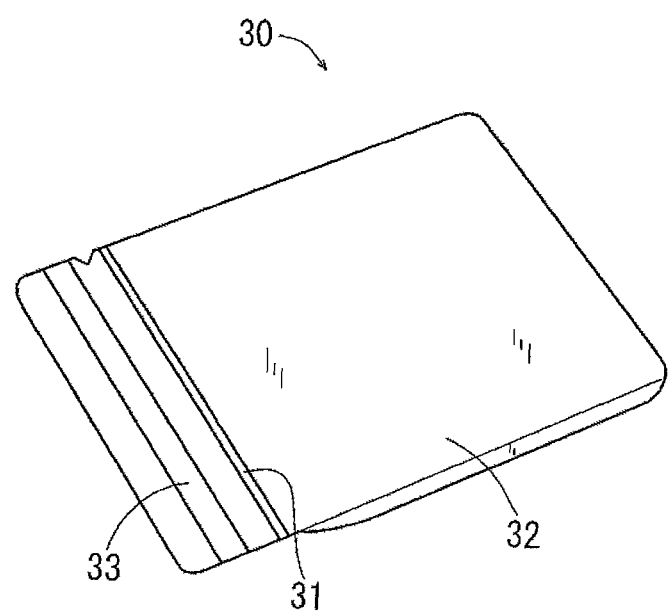
FIG. 3 is a perspective view of an example of a medical container having a sealing fastener to which the present invention is applied.

In FIG. 3, reference numeral 30 denotes an example of a medical container having a sealing fastener (sealing zipper) 31. The medical container 30 is particularly suitable if a medical substance is a solid preparation. Before use of the medical container 30, its front and rear exterior sheets are welded to each other at a portion which is slightly in front of the sealing fastener 31 (namely, a portion opposite to a main body 32 that stores solid preparations) so that a separate sealing belt 33 is formed. In use, a part between the sealing fastener 31 and the sealing belt 33 is cut along the sealing fastener 31 to open the sealing fastener 31. Accordingly, the required number of the solid preparations inside the medical container 30 are taken out. After the required number of the solid preparations are taken out, the sealing fastener 31 is closed again. The main body 32 is configured by using the exterior sheet, as will be described later.

In each of the medical containers 10, 20, and 30, the exterior sheet has a hydrogen-generating substance kneaded therein. Descriptions with respect to this point will be given with reference to FIG. 4. An exterior sheet 40 is configured by overlapping three sheet materials, namely, a first-layer sheet 41, a second-layer sheet 42 and a third-layer sheet 43, with one another successively from its inner surface side to its outer surface side. The first-layer sheet 41 is a sealant substrate and is formed of PP (polypropylene), PE (polyethylene) or PET (polyethylene terephthalate), for example. The second-layer sheet 42 is a barrier substrate and is formed of AL (aluminum foil), for example. The third-layer sheet 43 is a main substrate and is formed of PET or NY (nylon).

The hydrogen-generating substance in the form of fine-powdered ceramics is kneaded into the first-layer sheet 41. Accordingly, a medical substance in the medical container 10 (20, 30) constituted by the exterior sheet material 40 reacts with the hydrogen-generating substance kneaded in the first-layer sheet 41 to generate hydrogen.

The above ceramics contains a hydrogen-generating substance (for example, metal magnesium) and a mineral substance (for example, calcium) for generating mineral ions (the ceramics is obtained by firing a kneaded mixture of metal magnesium powders and calcium powders). Calcium is dissolved from the ceramics as calcium ions which are positively charged. The metal magnesium included in the ceramics reacts with water to generate magnesium hydroxide and hydrogen gas. During the generation process of hydrogen gas, reduced hydrogen is generated. The reduced hydrogen is absorbed by the calcium ions thereby some moisture in the medical substance is converted to hydrogen-reduced water. Hydrogen-reduced water, which is drunk in order to provide an anti-oxidation action to a human body or the like, is preferable for the promotion of health.

For example, the above fine-powdered ceramics is obtained by firing a kneaded mixture of 30 mg of metal magnesium, 100 mg of calcium sulfite and 30 mg of other components to have a ball shape of approximately 5 mm in diameter and then by pulverizing the ball-shaped ceramics into fine powders.

Figure 4:
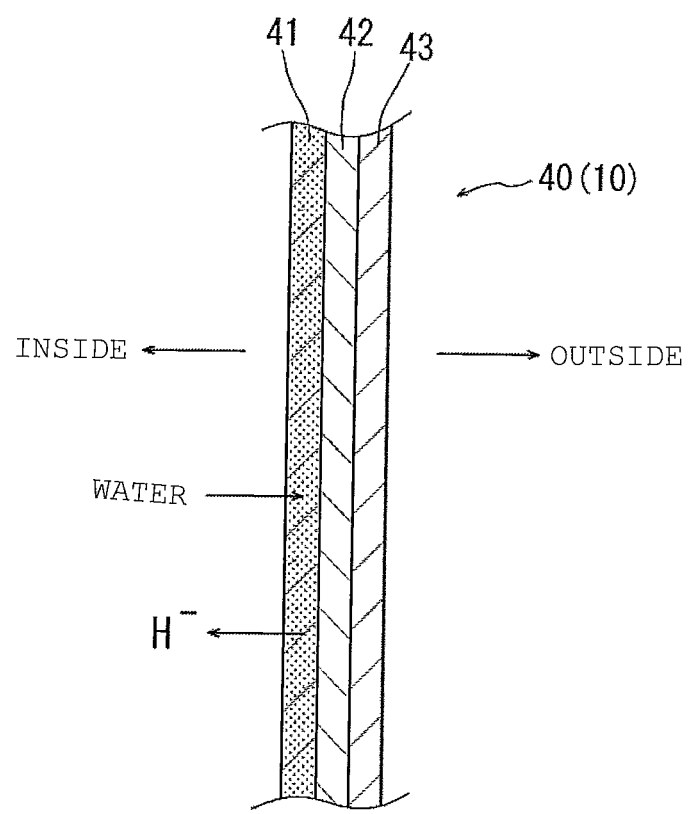
FIG. 4 is a sectional view of a main part of an exterior sheet material.
Figure 5:
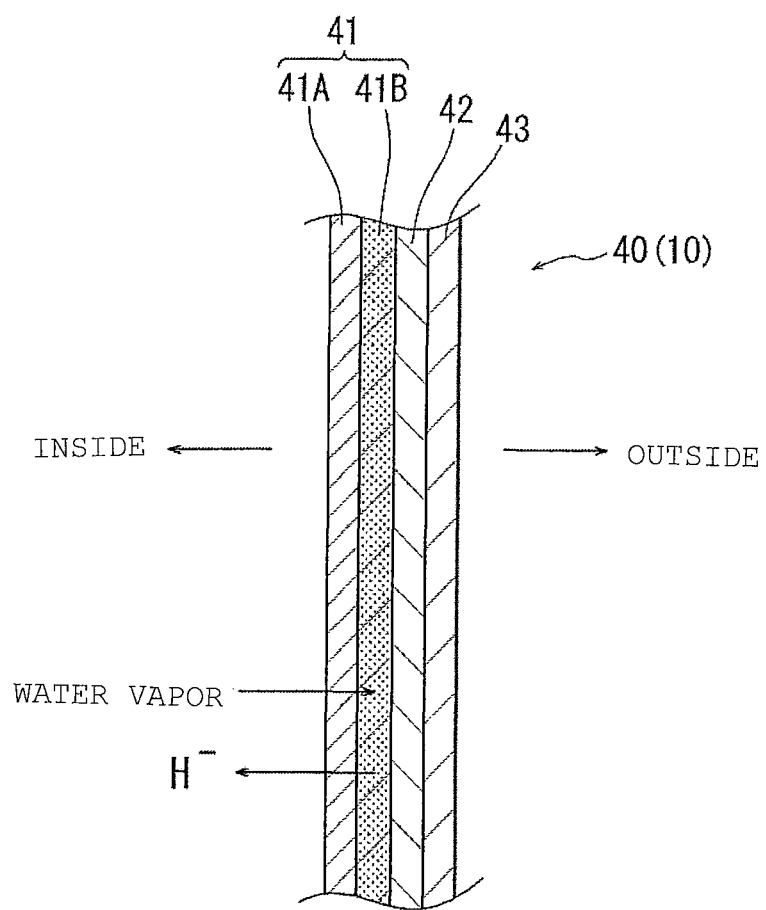
FIG. 5 is a sectional view of a main part of an exterior sheet material showing a modification of FIG. 4.

FIG. 5 shows a modification of FIG. 4. Specifically, in the embodiment shown in FIG. 5, the first-layer sheet 41 has a double-layer structure constituted by an inner sheet 41A and an outer sheet 41B. A hydrogen-generating substance is kneaded into the outer sheet 41B. Furthermore, the inner sheet 41A does not permit passage of water (liquid water) but permits passage of water vapor. Accordingly, the present modification is advantageous for controlling the amount of hydrogen gas generated in the medical container 10 per unit time (is advantageous for slow generation of hydrogen gas). The present modification is also advantageous for preventing reactants excluding hydrogen (for example, magnesium hydroxide if metal magnesium is used as the hydrogen-generating substance) from eluting into the container during the generation of hydrogen by the reaction with water.

The inner sheet 41A may be a commercial film sheet that does not permit the passage of liquid water but permits the passage of water vapor. For example, the water-vapor passage amount (that is, the generation amount of hydrogen gas per unit time) can be easily adjusted by adjusting the amount of an additive such as mica, EVOH or the like. Ideally, a hydrogen-generating substance is prepared as a masterbatch for improvement in dispersibility when the hydrogen-generating substance is kneaded. Furthermore, the water-vapor passage amount can be controlled more severely by simultaneously using a water-vapor permeable resin as a master resin.

In another modification of FIG. 4, a hydrogen-generating substance may be kneaded into the second-layer sheet 42. In this case, the first-layer sheet 41 may permit the passage of both liquid water and water vapor or may permit the passage of water vapor while it does not permit the passage of liquid water.

A hydrogen-generating substance, an additive and the like tend to be concentrated in the film-thickness center when a sheet is formed, due to its characteristic of moving to an area with a low crystal density. Therefore, in the case of FIG. 4, for example, when a sheet that does not permit the passage of liquid water and permits the passage of water vapor is used as the first-layer sheet 41 having a hydrogen-generating substance kneaded therein, the hydrogen-generating substance is caused to be concentrated in the film-thickness center of the first-layer sheet 41. Thus, the present modification is advantageous for preventing reactants excluding hydrogen from eluting into the container (this is also true in the case where a hydrogen-generating substance is kneaded into the outer sheet 41B in FIG. 5).

Although the embodiments have been described above, the present invention is not limited these embodiments and can be appropriately modified within the scope of the claims. The hydrogen-generating substance is not limited to metal magnesium. An appropriate substance such as a nickel catalyst, pure calcium (metal calcium), titanium, titanium oxide, and ion exchange resin can be used as the hydrogen-generating substance. As the mineral substance, an appropriate substance such as sodium and potassium can be used. For example, the hydrogen-generating substance and the mineral substance that are present independently from each other (for example, powdery or granular) may be sealed without being converted to ceramics. Separate ceramics that radiates weak currents and far-infrared rays may be sealed in the medical container 10.

The number of the layers or the material of the exterior sheet material 40 can be modified as appropriate. The exterior sheet may have only a hydrogen-generating substance kneaded therein without containing a mineral substance. The medical substance is not limited to substances for medicines and medical treatment. The medical substance also includes a quasi-drug (cosmetics, for example). The hydrogen-generating substance is preferably kneaded into the substantially whole inner surface of the exterior sheet. However, it suffices that the hydrogen-generating substance is kneaded into only part of the inner surface area. The shape and the structure of the medial container may vary depending on a medical container to be enclosed therein. For example, the medical container may be opened by cutting or tearing part of the medical container. It suffices that the medical container includes the exterior sheet (particularly, an exterior sheet having flexibility) part of which the hydrogen-generating substance is kneaded into. The medical container may include a rigid part. As the exterior sheet that the hydrogen-generating substance is kneaded into, a sheet having a water absorbing property is preferable. However, a sheet having no water absorbing property suffices (it suffices that the hydrogen-generating substance is exposed to the inner sheet of the exterior sheet). An object of the present invention is not limited to the object specified herein. Objects of the present invention implicitly include to provide those that have been expressed as actually preferable or advantageous one herein. Further, the present invention can be considered as a medical container that has a medical substance enclosed therein.

The present invention enables the long-term preservation of medical substances and is beneficial to extend the expiration dates of medical substances.

REFERENCE SIGNS LIST

10: (BAG SHAPED) MEDICAL CONTAINER
20: (TUBE SHAPED) MEDICAL CONTAINER
30: MEDICAL CONTAINER (WITH SEALING FASTENER)
40: EXTERIOR SHEET MATERIAL
41: FIRST-LAYER SHEET
41A: INNER SHEET
41B: OUTER SHEET
42: SECOND-LAYER SHEET
43: THIRD-LAYER SHEET

The invention claimed is:

1. A medical container which can be opened and closed with a sealing fastener, and which is configured to enclose a solid preparation therein, the medical container comprising:
    an exterior sheet comprising a first layer sheet and a second layer sheet, the first layer sheet and the second layer sheet overlapping with one another in a direction from an inner surface side of the exterior sheet to an outer surface side of the exterior sheet,
    wherein the first layer sheet comprises an inner sheet and an adjacent outer sheet,
    wherein the inner sheet is configured to absorb water, permit passage of water vapor and not permit passage of liquid water,
    wherein a hydrogen-generating substance for generating hydrogen gas by reacting with moisture is kneaded into the outer sheet, and the hydrogen-generating substance generates hydrogen when moisture that passes through the inner-sheet contacts the hydrogen-generating substance in the outer sheet, and
    wherein the second layer sheet is a barrier layer that comprises aluminum foil.

2. The medical container of claim 1,
    wherein said exterior sheet is formed by attaching the outer sheet to an inner surface of the second layer sheet.

3. The medical container of claim 2, wherein said outer sheet is attached to only part of said second sheet.

4. The medical container of claim 1, wherein the hydrogen-generating substance is kneaded in the form of fine-powdered ceramics obtained by firing a mixture of the hydrogen-generating substance and a mineral substance.

5. The medical container of claim 4,
    wherein said hydrogen-generating substance is metal magnesium,
    and wherein said mineral substance is calcium.

6. A medical container which can be opened and closed with a sealing fastener, and which is configured to enclose a solid preparation therein, the medical container comprising:
    an exterior sheet comprising a first layer sheet and a second layer sheet, the first layer sheet and the second layer sheet overlapping with one another in a direction from an inner surface side of the exterior sheet to an outer surface side of the exterior sheet,
    wherein the first layer sheet is configured to absorb water, permit passage of water vapor and not permit passage of liquid water, and wherein a hydrogen-generating substance for generating hydrogen gas by reacting with moisture in air introduced into the medical container when the sealing fastener is opened, is kneaded into the first layer sheet, and the hydrogen-generating substance generates hydrogen when moisture that passes through the first layer sheet contacts the hydrogen-generating substance in the first layer sheet, and
    wherein the second layer sheet is a barrier layer that comprises aluminum foil.

7. The medical container of claim 6, wherein the hydrogen-generating substance is kneaded in the form of fine-powdered ceramics obtained by firing a mixture of the hydrogen-generating substance and a mineral substance.

8. The medical container of claim 7, wherein said hydrogen-generating substance is metal magnesium, and wherein said mineral substance is calcium.

9. The medical container of claim 1, wherein the generated hydrogen gas reacts with oxygen in the container to prevent or reduce oxidation of the solid preparation therein.

10. The medical container of claim 7, wherein the generated hydrogen gas reacts with oxygen in the container to prevent or reduce oxidation of the solid preparation therein.

* * * * *